United States Patent
Braghin et al.

(10) Patent No.: US 12,321,483 B2
(45) Date of Patent: Jun. 3, 2025

(54) AUGMENTED PRIVACY DATASETS USING SEMANTIC BASED DATA LINKING

(71) Applicant: International Business Machines Corporation, Armonk, NY (US)

(72) Inventors: Stefano Braghin, Dublin (IE); Killian Levacher, Dublin (IE); Christian Pinto, Dublin (IE); Marco Simioni, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 883 days.

(21) Appl. No.: 17/101,470

(22) Filed: Nov. 23, 2020

(65) Prior Publication Data
US 2022/0164471 A1 May 26, 2022

(51) Int. Cl.
*G06F 16/21* (2019.01)
*G06F 21/62* (2013.01)
(Continued)

(52) U.S. Cl.
CPC ........ *G06F 21/6245* (2013.01); *G06F 16/213* (2019.01); *G06F 40/216* (2020.01); *G06F 40/30* (2020.01)

(58) Field of Classification Search
CPC .... G06F 16/213; G06F 16/36; G06F 18/2115; G06F 21/6245; G06F 40/216; G06F 40/30; G06N 5/022
See application file for complete search history.

(56) References Cited

U.S. PATENT DOCUMENTS

| 6,707,463 B1 | 3/2004 | Gibson |
| 7,356,599 B2 | 4/2008 | Pochon |

(Continued)

FOREIGN PATENT DOCUMENTS

| CN | 104604200 A | 5/2015 |
| CN | 111782781 A | 10/2020 |

(Continued)

OTHER PUBLICATIONS

"Wolfram Knowledgebase: Making the Knowledge of the World Computable", 2020 Wolfram, 2 Pages, https://www.wolfram.com/knowledgebase. (Year: 2020).*

(Continued)

*Primary Examiner* — Matthew J Ellis
(74) *Attorney, Agent, or Firm* — Steven M. Bouknight

(57) ABSTRACT

Disclosed are techniques for linking information about individual entities across multiple datasets. A target dataset with some information corresponding to at least one attribute of an entity is received. Semantic processing is performed on the target dataset to extract semantic representations of the information and corresponding attributes, which is utilized to search at least one other dataset for additional information that is absent from the target dataset, corresponding to at least one attribute of the entity, which are used to augment the target dataset with additional information corresponding to the entity. This is repeated iteratively, with each subsequent iteration including semantic representations of information found in the searches of previous iterations until no additional information about the entity is found when searching the multiple datasets with semantic representations of the now augmented target dataset. In some embodiments the augmented target dataset is used for determining privacy risks for the entity.

9 Claims, 5 Drawing Sheets

(51) Int. Cl.
  *G06F 40/216* (2020.01)
  *G06F 40/30* (2020.01)

(56) References Cited

U.S. PATENT DOCUMENTS

| | | | | |
|---|---|---|---|---|
| 8,316,054 | B2* | 11/2012 | El Emam | G06F 16/284 |
| | | | | 713/189 |
| 9,483,464 | B2 | 11/2016 | Baek | |
| 10,296,505 | B2 | 5/2019 | Yueh | |
| 10,565,222 | B2 | 2/2020 | Murray | |
| 2015/0135329 | A1* | 5/2015 | Aghasaryan | H04L 63/0421 |
| | | | | 726/26 |
| 2015/0286731 | A1* | 10/2015 | Khosravy | G06Q 30/0201 |
| | | | | 707/722 |
| 2016/0092474 | A1* | 3/2016 | Stojanovic | G06F 16/211 |
| | | | | 707/805 |
| 2017/0060950 | A1 | 3/2017 | Budhiraja | |
| 2018/0027006 | A1* | 1/2018 | Zimmermann | H04L 63/0227 |
| | | | | 726/11 |
| 2018/0046679 | A1* | 2/2018 | Sharifi Sedeh | G06F 16/24575 |
| 2018/0075104 | A1* | 3/2018 | Oberbreckling | G06F 16/254 |
| 2020/0089766 | A1 | 3/2020 | Lassoued | |
| 2020/0193018 | A1* | 6/2020 | Van Dyke | G06F 21/6245 |
| 2020/0210417 | A1 | 7/2020 | Murray | |
| 2021/0203673 | A1* | 7/2021 | dos Santos | H04L 63/1425 |
| 2021/0232632 | A1* | 7/2021 | Howard | G06F 16/9038 |

FOREIGN PATENT DOCUMENTS

| | | |
|---|---|---|
| JP | 6568935 B2 | 8/2019 |
| WO | 2019/245578 A1 | 12/2019 |

OTHER PUBLICATIONS

Wolfram "Wolfram Knowledgebase: Making the Knowledge of the World Computable", 2020, 2 Pages, https://www.wolfram.com/knowledgebase. (Year: 2020).*

"DBpedia", © Copyright 2020 by DBpedia, 3 pages, <https://wiki.dbpedia.org/>.

"Wikidata", last edited on Dec. 30, 2019, 4 pages, <https://www.wikidata.org/wiki/Wikidata:Main_Page>.

"Wolfram Knowledgebase: Making the Knowledge of the World Computable", © 2020 Wolfram, 2 pages, <https://www.wolfram.com/knowledgebase/>.

Antonatos, et al., "Prima: an End-to-End Framework for Privacy at Scale", 2018 IEEE 34th International Conference on Data Engineering, pp. 1531-1542, <https://ieeexplore.ieee.org/document/8509392>.

Buneman, et al., "A Query Language and Optimization Techniques for Unstructured Data", ACM SIGMOD Record, vol. 25, No. 2, Mar. 2001, 27 pages, <https://www.researchgate.net/publication/2393063_A_Query_Language_and_Optimization_Techniques_for_Unstructured_Data>.

Cheng, et al., "Design and evaluation of small-large outer joins in cloud computing environments", Journal of Parallel and Distributed Computing, vol. 110, Dec. 2017, pp. 2-15, <https://www.sciencedirect.com/science/article/pii/S0743731517300758>.

Cheng, et al., "Efficient Large Outer Joins over MapReduce", Proceedings of the 22nd International European Conference on Parallel Processing (Euro-Par'16), Aug. 2016, pp. 334-346, <https://iccl.inf.tu-dresden.de/web/Inproceedings3079/en>.

Christen, et al., "Quality and Complexity Measures for Data Linkage and Deduplication", Studies in Computational Intelligence (SCI), 2007, vol. 43, pp. 127-151, <https://cs.anu.edu.au/~Peter.Christen/publications/qmdm-linkage.pdf>.

Guillet, et al., "Quality Measures in Data Mining", Springer, Dec. 2006, 16 pages, <https://www.researchgate.net/publication/230752326_Quality_Measures_in_Data_Mining>.

Harron, et al., "Methodological Developments in Data Linkage", Wiley Series in Probability and Statistics, Wiley, Sep. 2015, 7 pages, <https://www.wiley.com/en-US/Methodological+Developments+in+Data+Linkage-p-9781119072485>.

Hellerstein, Joseph, "Optimization Techniques for Queries with Expensive Methods", ACM Transactions on Database Systems, Jun. 1998, vol. 23, No. 2, pp. 113-157, <https://dl.acm.org/doi/10.1145/292481.277627>.

Herodotou, et al., "Query Optimization Techniques for Partitioned Tables", Conference: Proceedings of the ACM SIGMOD International Conference on Management of Data, 2011, 13 pages, <https://www.researchgate.net/publication/221214528_Query_Optimization_Techniques_for_Partitioned_Tables>.

Jarke, et al., "Query Optimization in Database Systems", ACM Computing Surveys, vol. 16, No. 2, pp. 111-152, <https://dl.acm.org/doi/10.1145/356924.356928>.

Kedad, et al., "Ontology-Based Data Cleaning", International Conference on Application of Natural Language to Information Systems, NLDB 2002: Natural Language Processing and Information Systems, Preview Only, pp. 137-149, <https://link.springer.com/chapter/10.1007%2F3-540-36271-1_12>.

Swami, Arun, "Optimization of large join queries: Combining heuristics and combinatorial techniques", ACM SIGMOD Record, vol. 18, No. 2, May 1989, pp. 367-376, <https://www.researchgate.net/publication/234815132_Optimization_of_large_join_queries_Combining_heuristics_and_combinatorial_techniques>.

Swami, et al., "Optimization of Large Join Queries", SIGMOD '88: Proceedings of the 1988 ACM SIGMOD international conference on Management of data, Jun. 1988, pp. 8-17, <https://doi.org/10.1145/50202.50203>.

Wang, et al., "An Ontology-Based Approach to Data Cleaning", Proceedings of the 11th International Conference on Information Quality, Jan. 2006, 12 pages, <https://www.researchgate.net/publication/220918826_An_Ontology-Based_Approach_for_Data_Cleaning>.

* cited by examiner

AUGMENTED PRIVACY DATASETS USING SEMANTIC BASED DATA LINKING

BACKGROUND

The present invention relates generally to the field of data privacy management, and more particularly to data aggregation techniques for data privacy management.

Information or data privacy is the relationship between the collection and dissemination of data, technology, the public expectation of privacy, and the legal and political issues surrounding them. A significant challenge for data privacy is that it relies upon data while trying to protect an individual's privacy preferences and personally identifiable information. The fields of computer security, data security, and information security all design and use software, hardware, and human resources to address data privacy.

Natural language processing, sometimes abbreviated as NLP, is considered a subfield of linguistics, computer science, and artificial intelligence concerned with the interactions between computers and human language. Particularly, how to program computers to process and analyze large amounts of natural language data.

Semantic similarity is a metric applied to a set of terms or documents, where a distance between items is based on the likeness of their semantic content or meaning instead of lexicographical similarity. These are mathematical tools used to approximate the strength of the semantic relationship between units of language, concepts or instances, through a numerical description obtained by comparison of information supporting their meaning or describing their nature. At a high level of generality, semantic similarity, semantic distance, and semantic relatedness typically mean, "How much does term X have to do with term Y?" The answer to this question is often expressed as a numerical value ranging between −1 and 1, or between 0 and 1, where 1 represents a significant degree of similarity.

SUMMARY

According to an aspect of the present invention, there is a method, computer program product and/or system that performs the following operations (not necessarily in the following order): (i) receiving a target dataset comprising a plurality of subsets corresponding to a plurality of entities, with a given subset including information indicative of at least one attribute of a given corresponding entity; (ii) for a given subset, determining semantic representations corresponding to the at least one attribute of the given entity; and (iii) augmenting the target dataset, using the determined semantic representations of the target dataset as initial parameters, iteratively until determining that there are no semantic representations of the given entity present in the identified auxiliary datasets corresponding to an attribute omitted from the target dataset, including: (a) identifying auxiliary datasets including information indicative of attributes corresponding to the given entity based, at least in part, on the determined semantic representations of the target dataset, (b) determining semantic representations of the attributes of the given entity present in the auxiliary datasets, (c) determining at least one semantic representation of the given entity present in the identified auxiliary datasets corresponds to an attribute omitted from the target dataset, and (d) augmenting the target dataset with the determined semantic representations corresponding to the attribute omitted from the target dataset.

DETAILED DESCRIPTION

Figure 1:
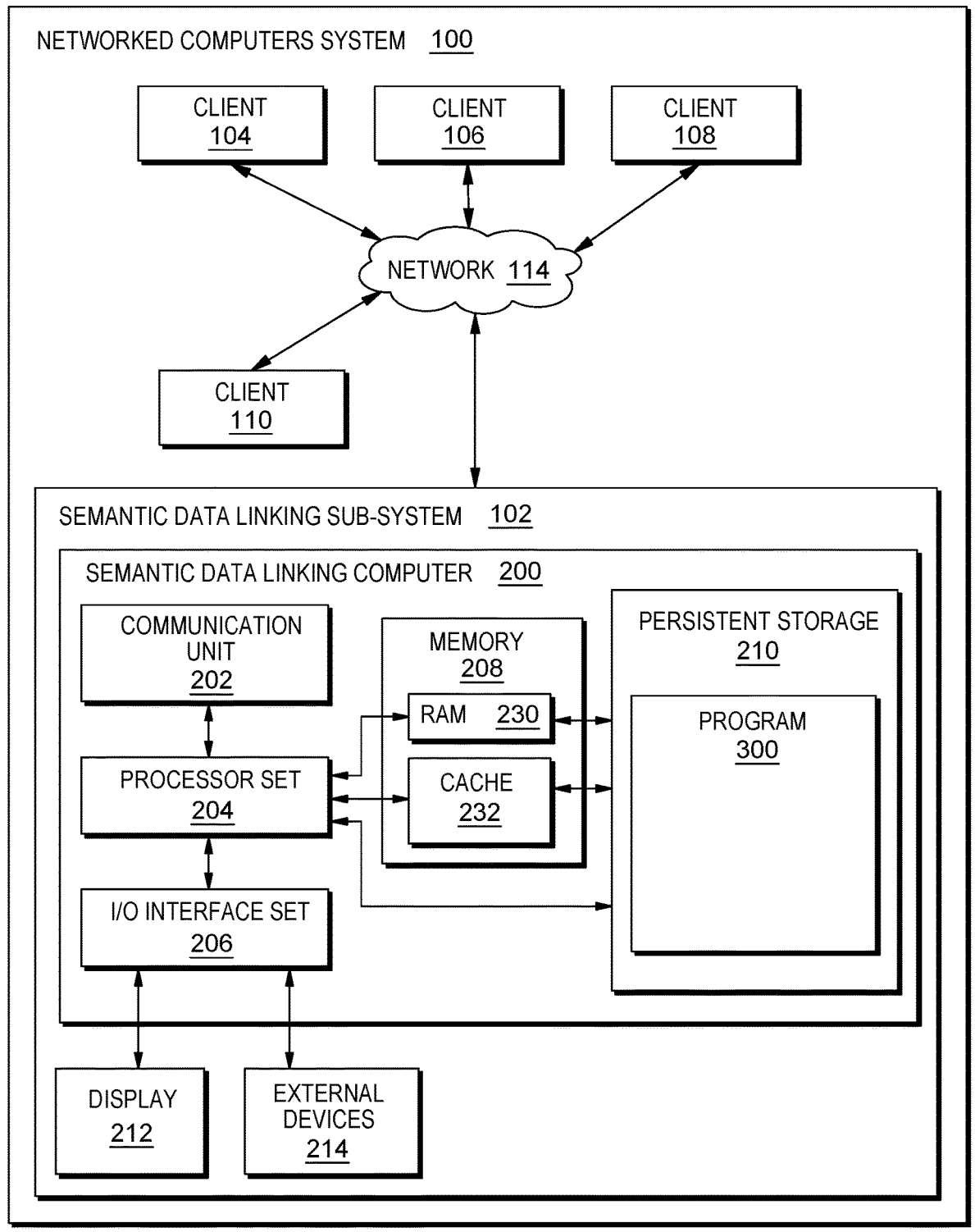
FIG. 1 is a block diagram view of a first embodiment of a system according to the present invention.

Some embodiments of the present invention are directed to techniques for linking information about individual entities across multiple datasets. A target dataset with some information corresponding to at least one attribute of an entity is received. Semantic processing is performed on the target dataset to extract semantic representations of the information and corresponding attributes, which is utilized to search at least one other dataset for additional information that is absent from the target dataset, corresponding to at least one attribute of the entity, which are used to augment the target dataset with additional information corresponding to the entity. This is repeated iteratively, with each subsequent iteration including semantic representations of information found in the searches of previous iterations until no additional information about the entity is found when searching the multiple datasets with semantic representations of the now augmented target dataset. In some embodiments the augmented target dataset is used for determining privacy risks for the entity.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium, sometimes referred to as a machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: semantic data linking subsystem 102 (sometimes herein referred to, more simply, as subsystem 102); client subsystems 104, 106, 108, 110; and communication network 114. Semantic data linking subsystem 102 includes: semantic data linking computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device(s) 214. External device(s) 214 will typically include devices such as a keyboard, keypad, a touch screen, and/or some other suitable input device. External device(s) 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
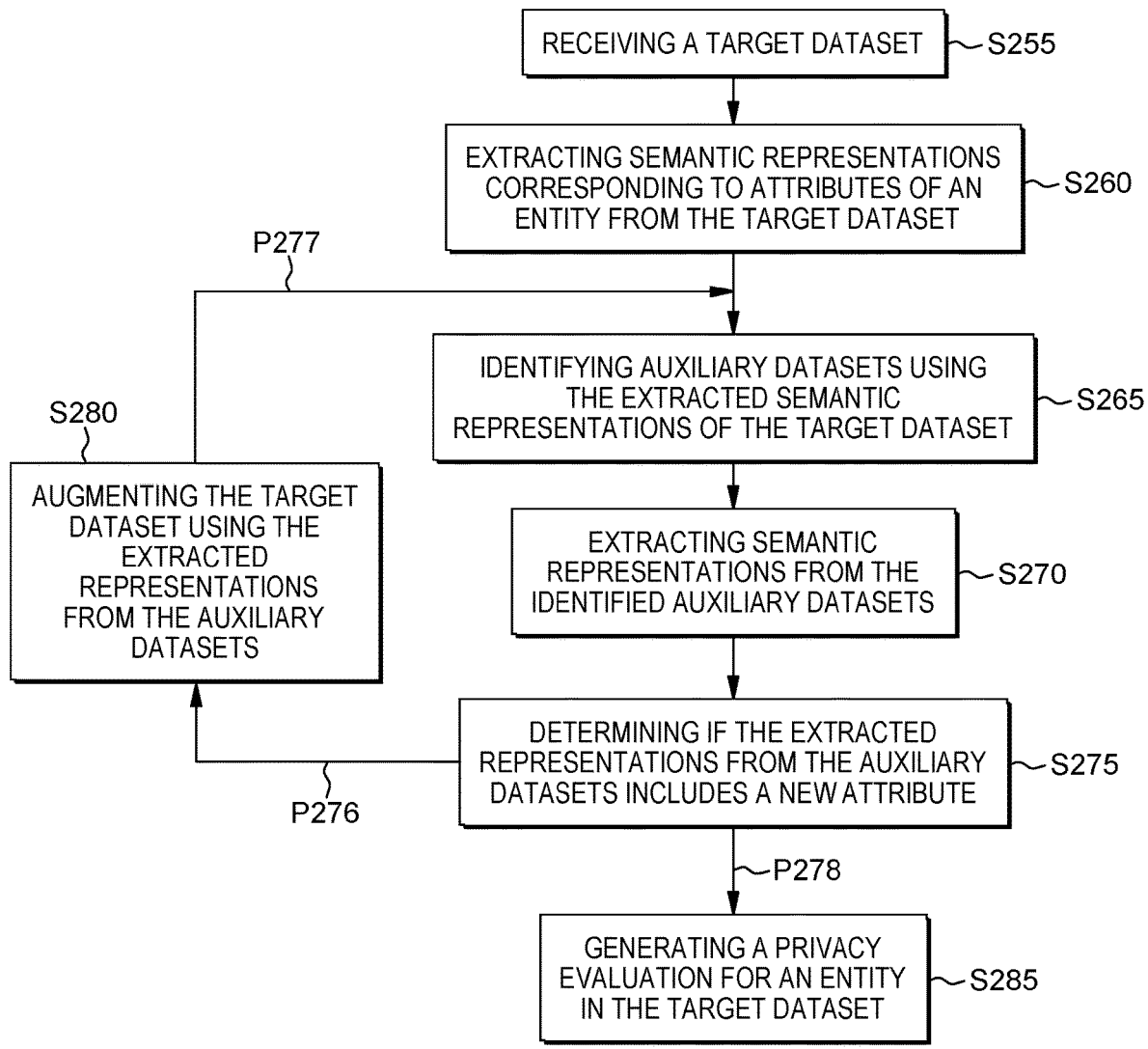
FIG. 2 is a flowchart showing a first embodiment method performed, at least in part, by the first embodiment system.
Figure 3:
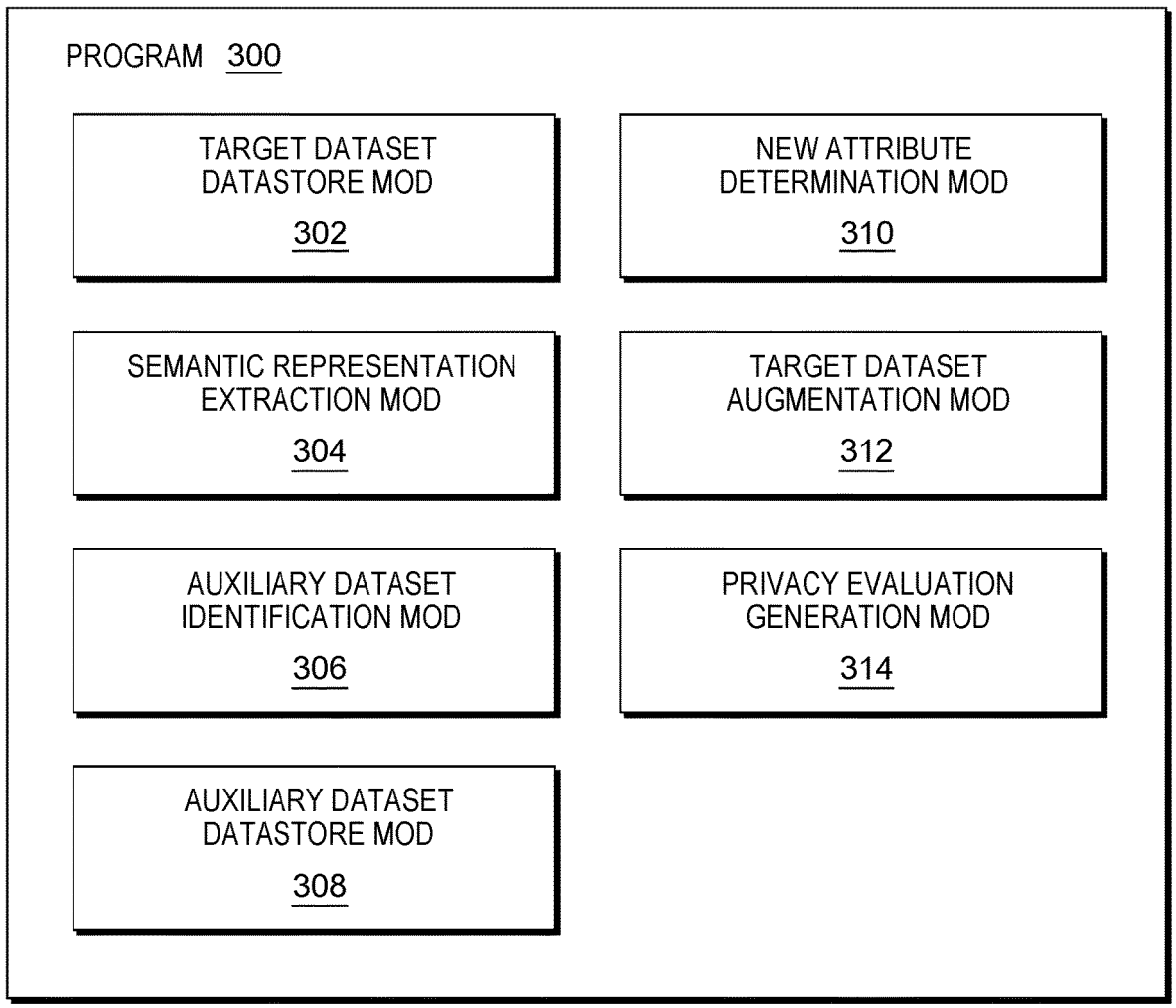
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where target dataset datastore module ("mod") 302 receives a target dataset. In this simplified embodiment, the target dataset, received from client 104 of FIG. 1 over network 114, includes a plurality of subsets corresponding to a plurality of entities, where each entity corresponds to an individual human. The target dataset also includes information indicative of selection of one of the entities as the target for subsequent operations of this embodiment of the present invention. The target dataset, in this simplified embodiment, is a list of former Presidents of the United States of America, comprises three subsets with single attribute, a name of a former President, including the following: (i) "George Washington"; (ii) "Abraham Lincoln"; and (iii) "Franklin Roosevelt". The target dataset further includes metadata indicating that the target dataset is a list of names and a selection of subset (iii) as the target entity. A person of ordinary skill in the art appreciates that the content of the target dataset and subsets in this simplified example embodiment are merely examples and illustrative of individual humans and their attributes according to an embodiment of the present invention. In some alternative embodiments, the information indicative of selection of one of the entities as the target for subsequent operations of this embodiment of the present invention is omitted and each entity of the target dataset is analyzed in turn. In some alternative embodiments, the subsets include a plurality of attributes corresponding to their respective entity.

Processing proceeds to operation S260, where semantic representation extraction mod 304 extracts semantic representations corresponding to attributes of an entity from the target dataset. In this simplified embodiment, semantic representation extraction mod 304, using the metadata present in the target dataset, extracts a semantic representation of "name=Franklin Roosevelt" as an attribute of "name" corresponding to an entity named "Franklin Roosevelt" from the "Franklin Roosevelt" present in subset (iii) of the target dataset stored in target dataset datastore mod 302. In some alternative embodiments, an external dataset containing normalized semantic information corresponding to a plurality of entities is used to assist in extracting semantic representations from the target dataset. In some alternative embodiments, machine-learning techniques are leveraged to train a machine learning model for extracting semantic representations from target datasets, used to assist in extracting semantic representations from the target dataset.

Processing proceeds to operation S265, where auxiliary dataset identification mod 306 identifies auxiliary datasets using the extracted semantic representations of the target dataset, storing the identified auxiliary datasets in auxiliary dataset datastore mod 308. In this simplified embodiment, there are two auxiliary datasets: (i) a first auxiliary dataset on client 106 of FIG. 1; and (ii) a second auxiliary dataset on client 108. The first auxiliary dataset is another list of names of former Presidents of the United States (the first attribute of subsets of the first auxiliary dataset) and a number indicating their place in the succession of Presidents of the United States since the founding of the United States (the second attribute of the subsets of the first auxiliary dataset, sometimes referred to simply as a "succession number"), including the following three subsets: (i) (a) George Washington, (b) first President; (ii) (a) Abraham Lincoln, (b) sixteenth President; and (iii) (a) Franklin Roosevelt, (b) thirty-second President. In this simplified embodiment, the first auxiliary dataset additionally includes metadata describing the first attribute as corresponding to a name of a former President of the United States and the second attribute as corresponding to a succession number. The second auxiliary dataset is a list subsets including a first attribute corresponding to a succession number of a former President of the United States, a second attribute corresponding to a number indicating how many years that President served in office, and a third attribute corresponding to their birthday, including the following three subsets: (i) (a) $1^{st}$ President, (b) 8, and (c) February-22-1732; (ii) (a) $16^{th}$ President, (b) 4, and (c) February-12-1809; and (iii) (a) $32^{nd}$ President, (b) 12, and (c) January-30-1882. In this simplified embodiment, the second auxiliary dataset additionally includes metadata describing the first attribute as corresponding to a succession number of a former President of the United States, the second attribute as corresponding to a number indicating how many years that President served in office, and the third attribute as corresponding to their birthday. In some alternative embodiments, a plurality of auxiliary datasets are available for identification, including a plurality of publicly and privately available datasets, where each auxiliary dataset is previously annotated with metadata.

Processing proceeds to operation S270, where semantic representation extraction mod 304 extracts semantic representations from the identified auxiliary datasets stored in auxiliary dataset datastore mod 308. In this simplified embodiment, semantic representation extraction mod 304, using the metadata present in the first auxiliary dataset, extracts the following semantic representations from the first auxiliary dataset: (i) (a) "name=George Washington", (b) "succession number=1"; (ii) (a) "name=Abraham Lincoln", (b) "succession number=16"; and (iii) (a) "name=Franklin Roosevelt", (b) "succession number=32". Also in this simplified embodiment, semantic representation extraction mod 304, using the metadata present in the second auxiliary dataset, extracts the following semantic representations from second auxiliary dataset: (i) (a) "succession number=1", (b) "years of service=8", and (c) "birthday=2-22-1732"; (ii) (a) "succession number=16", (b) "years of service=4", and (c) "birthday=2-12-1809"; and (iii) (a) "succession number=32", (b) "years of service=12", and (c) "birthday=1-30-1882".

Processing proceeds to operation S275, where new attribute determination mod 310 determines if the extracted representations from the auxiliary datasets at S270 includes a new attribute. In this simplified embodiment, new attribute determination mod 310 compares the extracted semantic representations from the auxiliary datasets (first auxiliary dataset and second auxiliary dataset) corresponding to a selected target entity against the extracted semantic representations from the target dataset corresponding to the selected target entity. As indicated at S255, subset (iii), "Franklin Roosevelt", is the selected target entity in this simplified embodiment. Extracted semantic representations from the target dataset corresponding to the selected target entity includes only "name=Franklin Roosevelt". This extracted semantic representation is used to compare to the semantic representations of the auxiliary datasets to determine which subsets include a matching semantic representation.

If one or more subsets are found as including a matching semantic representation, new attribute determination mod 310 then parses matching subset(s) for any other attribute(s) and compares the semantic representations for those other attribute(s) against any semantic representations in the target dataset corresponding to the selected target entity to determine if any semantic representation of the other attribute(s) are omitted from the attributes in the subset of the target dataset corresponding to the selected target entity.

If the parsing of the matching subset(s) results in identifying one or more semantic representation(s) omitted from the semantic representations extracted from the target dataset, new attribute determination mod 310 determines the omitted semantic representation as a new attribute, and processing will along path P276 towards operation S280, discussed further below.

If no subsets are found to include a matching semantic representation, or if parsing the matching subset(s) determines that the attribute(s) of the matching subset(s) are already included in the subset of the target dataset corresponding to the selected target entity, processing proceeds along path P278 to operation S285, discussed further below.

In this simplified embodiment, as previously discussed, the semantic representation "name=Franklin Roosevelt" from the target dataset is compared against the semantic representations of the auxiliary datasets to determine if there are any matches, finding one in attribute (a) of subset (iii) of the first auxiliary dataset. No other subsets of the first auxiliary dataset or the second auxiliary dataset include a matching semantic representation. Next, new attribute determination mod 310 parses subset (iii) of the first auxiliary dataset for any other attributes that are not attribute (a), finding attribute (b), which includes the extracted semantic representation "succession number=32". Next, the extracted semantic representation "succession number=32" is compared against the semantic representations of the target dataset corresponding to the selected target entity to determine if there are any matches. At the moment, the semantic representations of the target dataset corresponding to the selected target entity only includes "name=Franklin Roosevelt", resulting in new attribute determination mod 310 finding that there are no matches, indicating that "succession number=32" is omitted from the appropriate subset of the target dataset corresponding to the selected target entity.

Responsive to new attribute determination mid 310 determining that the extracted representations from the auxiliary datasets at S270 includes a new attribute, processing proceeds along path P276 to S280, where target dataset augmentation mod 312 augments the target dataset using the extracted representations from the auxiliary datasets. In this simplified embodiment, augmenting the target dataset includes appending the semantic representations from the matching subset(s) of the auxiliary dataset(s) that are omitted from the semantic representations of the target dataset. Using the examples discussed in this simplified embodiment, "succession number=32" is appended to subset (iii) of the target dataset, augmenting the target dataset with additional attributes from the first auxiliary dataset.

Note that at this point, no semantic representations of attributes from the second auxiliary dataset have been found as matching the target dataset, nor appended to the target dataset as a result. Processing proceeds along path P277 back to S265, but in this iteration, the extracted representations of the target dataset, now augmented, include both "name=Franklin Roosevelt" and "succession number=32". This additional semantic representation, corresponding to an attribute not previously present in the target dataset, facilitates finding additional attributes that may be present in the auxiliary datasets that correspond to the selected target entity. Repeating through operations S265, S270, S275 and S280 will result in determining that, while the first auxiliary dataset does not include any new attributes of the selected target entity to augment the target dataset with, the second auxiliary dataset includes subset (iii) with a match of "succession number=32". Parsing through the other attributes of subset (iii) of the second auxiliary dataset results in determining there are two attributes in subset (iii) of the second auxiliary dataset corresponding to the selected target entity that are omitted from the (now augmented) target dataset: attribute (b) "years of service=12", and attribute (c) "birthday=1-30-1882". Both attribute (b) and attribute (c) are appended to subset (iii) of the (now augmented) target dataset, further augmenting subset (iii) of the target dataset. From here, processing proceeds along path P277 again, returning to operation S265. Progressing through operations S265, S270, and S275 this time results in determining that the extracted representations from the auxiliary datasets at S270 do not include a new attribute.

Figure 4:
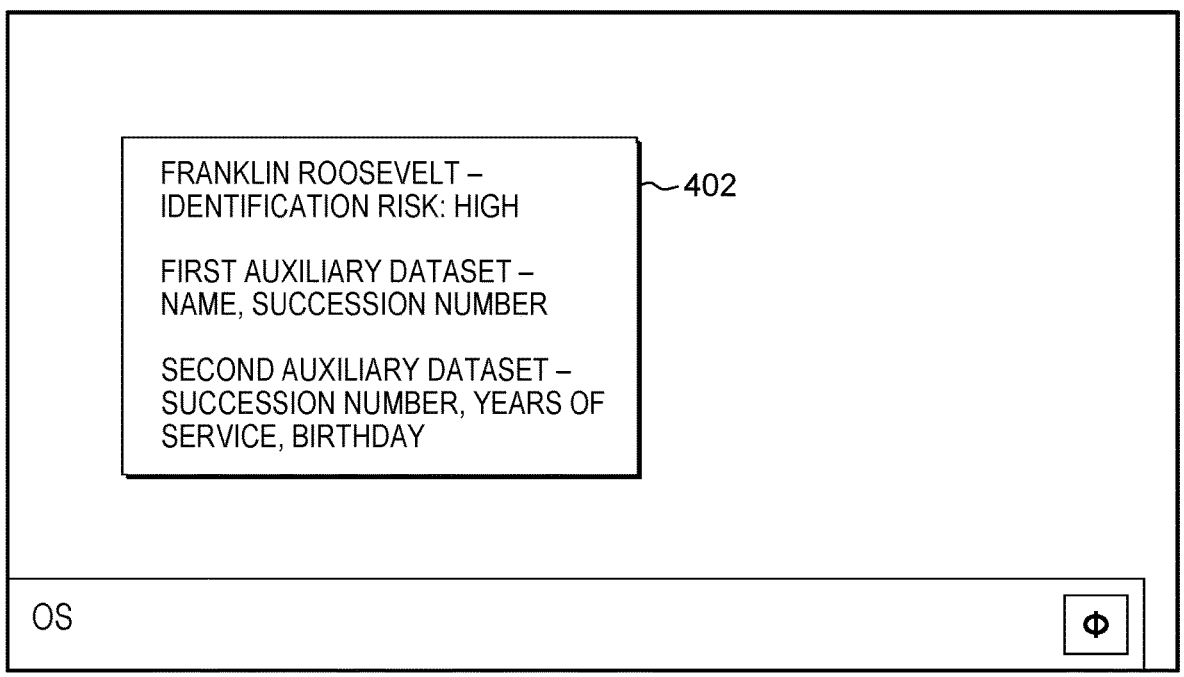
FIG. 4 is a screenshot view generated by the first embodiment system.

Responsive to new attribute determination mid 310 determining that the extracted representations from the auxiliary datasets at S270 do not include a new attribute, processing proceeds along path P278 to S285, where privacy evaluation generation mod 314 generates a privacy evaluation for an entity in the target dataset. In this simplified embodiment, the privacy evaluation is a numerical value indicating how likely it is that the selected target entity can be identified using the attributes (or semantic representations of attributes) in the target dataset corresponding to the selected target entity. Stated alternatively, how difficult it would be to identify the selected target entity using the attributes or semantic representations of said attributes corresponding to the selected target entity in the (now augmented) target dataset. For every attribute (or semantic representation of an attribute) corresponding to the selected target entity in the target dataset, one point is accumulated. If the accumulated points meet certain predefined thresholds, the likelihood of identification is scored as low, medium or high. In this simplified embodiment, the accumulated 4 points for the selected target entity indicated a high identification score, outputting message 402 of screenshot 400 of FIG. 4 over network 114 of FIG. 1 to client 110, displaying the message on a graphical user interface of a display device of client 110 (not shown).

In some alternative embodiments, predefined weights are assigned to different types of attributes (for example, a birthday carries more weight towards identifying the selected target entity than hair color). In some alternative embodiments, the target dataset, as augmented, is provided to a de-identification risk engine to evaluate the now augmented target dataset instead of the originally provided target dataset. In yet other alternative embodiments, remedial actions are executed based upon the privacy evaluation, including, but not limited to: (i) automatically redacting one or more attributes from the received target dataset; (ii) outputting an indication that the selected target entity has a risk of identification indicated by the privacy evaluation based on the target dataset; and (iii) outputting an indication including which auxiliary dataset includes which additional attributes.

Evaluating the augmented target dataset results in evaluating not only the original target dataset but how that target dataset may be combined with other available datasets that might yield additional attributes of a selected target entity. Information about individuals is often spread across many disparate datasets, with some datasets including some information but not others, or some datasets where attempts to anonymize data about individuals is ineffective if the remaining information can be effectively correlated to other datasets that are not anonymized.

III. Further Comments and/or Embodiments

Some embodiments of the present invention recognize the following facts, potential problems and/or potential areas for improvement with respect to the current state of the art: (i) privacy legislations like General Data Protection Regulation (GDPR) and California Consumer Privacy Act (CCPA) require the data controller to properly assess the risk of data leakage and the intrinsic risk of breaching the privacy of the individuals represented in the data; (ii) privacy risk assessment is a complex task, as several dimensions should be considered when performing the assessment; (iii) a critical aspect that needs to be considered is the probability of reidentifying the individuals in the dataset by means of linking such dataset with external data sources (either public and/or private resources); this operation, i.e. linking datasets, is at the moment performed in a trivial ad hoc manner, by means of equality join operations; (iv) more advanced techniques do exist but they tend to focus on improving the speed of such linking by means of pre-processing the knowledge base to reduce the size of the knowledge base against which the linking is performed; and (v) the evaluation of privacy risks of anonymized datasets with respect to their vulnerability to potential data linking attacks should be automated in order to fully assess the risks they are exposed to with respect to existing data repositories potentially used by attackers once this data is released.

Some embodiments of the present invention may include one, or more, of the following operations, features, characteristics and/or advantages: (i) a new technique to perform semantic based dataset linking by augmenting and normalizing the datasets involved in the linking; (ii) mapping each individual label of the involved dataset against semantic concepts, which are independent on the language, encoding and format in which values are represented; (iii) a system and the associated method for estimation of data linkage risk for micro datasets by means of semantic based data normalization and augmentation; (iv) domain: online privacy, anonymity networks, web applications; and (v) the use of semantic web/linked data technologies to normalize and augment (micro) datasets to perform empirical data linking against publicly and privately available knowledge bases (large, potentially non anonymized, datasets).

Some embodiments of the present invention may include one, or more, of the following operations, features, characteristics and/or advantages: (i) a target dataset is passed as an input of the system, optionally with additional information about the content of the dataset; (ii) a metadata extractor analyzes the dataset and identifies its content, in terms of schema, semantic type, language, encoding etc.; (iii) this step can be optional if such information is provided by the user as input to the system; (iv) the content of target dataset and the (perhaps extracted) metainformation are then normalized by the data normalizer component; (v) a data linkage engine thereafter maps individual normalized values and metainformation of the dataset (eg: entity Justin Trudeau) to pre-existing normalized values contained within asemantic normalized knowledge bases (eg: Prime Minister of Canada); (vi) this semantic normalized knowledge base is populated a-priori of this system being run using external knowledge bases (for example, WikiData, DBpedia, or proprietary knowledge bases like Wolfram Knowledgebase); (vii) the link target discovery is made responsible for the identification of which dataset to use to expand, according to context and any additional information available; (viii) a data linkage engine also links the dataset with other, previously annotated, private and public datasets; (ix) the data augmentation engine thereafter uses the links provided by the data linkage engine and augments the dataset with the attributes contained within the various data repositories each data entity is linked to; (x) steps v-vii and ix are iterated until it is not possible to identify any more meaningful data links in any of the data repositories; and (xi) finally, the augmented dataset is assessed against standard de-identification risk engine.

Some embodiments of the present invention may include one, or more, of the following operations, features, characteristics and/or advantages: (i) system/method for estimating the risk of re-identification of dataset using semantic-based data augmentation and normalization techniques comprising of: (a) A metadata extractor component, (b) a data normalizer component, (c) a data linking engine, (d) a data augmentation engine, and (e) a de-identification risk estimation component; (ii) the previously referenced dataset analysis component analyzes the input dataset to extract meta information (such as dataset schema, field data type, infer field semantic type, field value distribution and more); (iii) the previously mentioned data normalizer component uses the output of the previously mentioned data analysis component to normalize the values contained in the dataset according to an optionally user provided knowledge base, transforming individual values to the semantic representation of the value itself; (iv) the previously mentioned linking target discovery component uses the output of the data normalized component and identifies potential linking datasets from the set of accessible datasets (both privately and publicly); (v) the data augmentation component executes the augmentation of the normalized dataset created by the data normalizer component and expands its set of features according to the ones available in the matching dataset identified by the linking target discovery component; and (vi) the identification risk estimation component applies risk metrics, methods and systems to the augmented dataset to provide a reliable estimate of the risk of identifying the individual contained in the input dataset.

Figure 5:
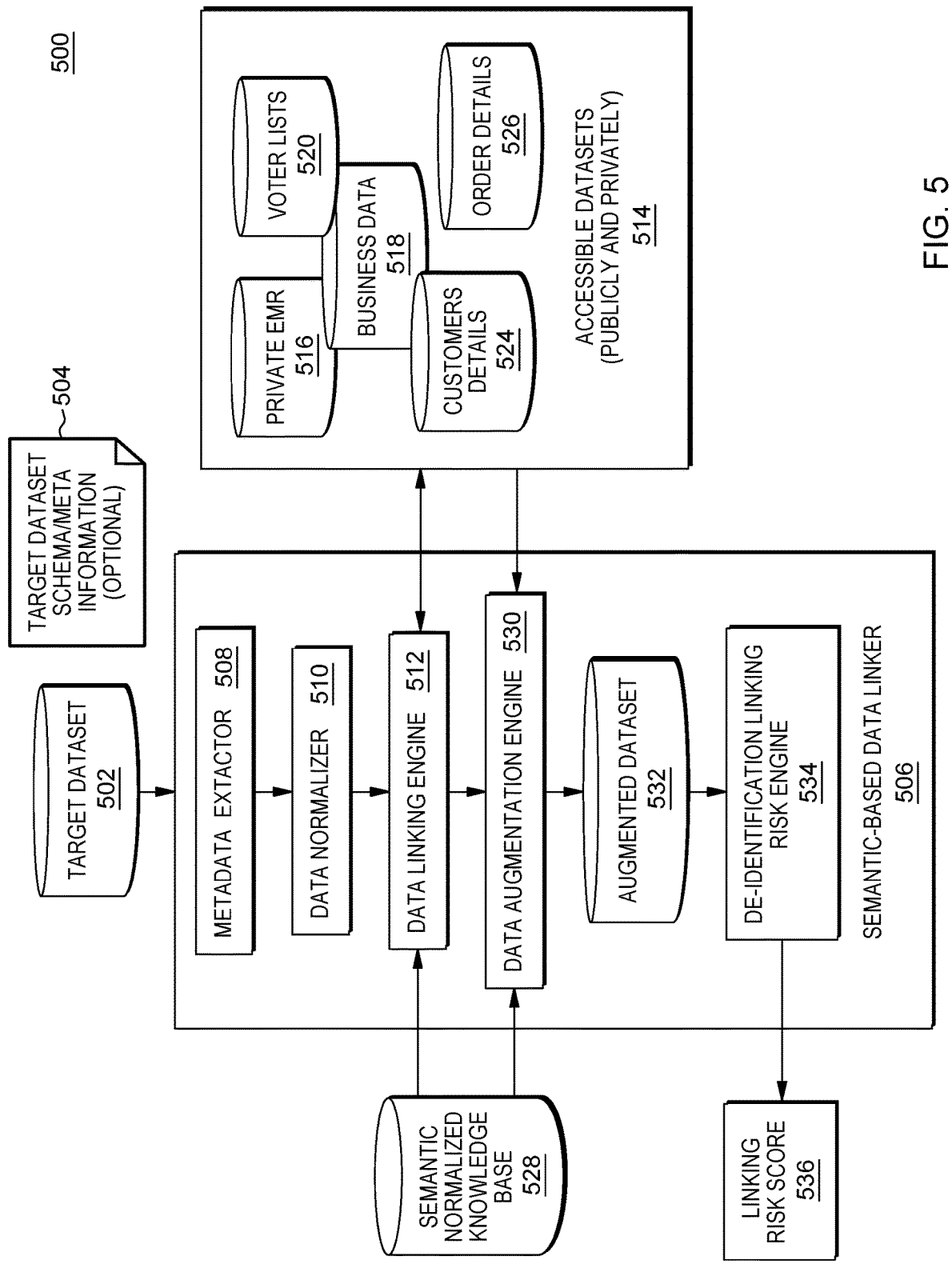
FIG. 5 is a block diagram view of a second embodiment system according to the present invention.

Referring to FIG. 5, block diagram 500 describes a system according to a second embodiment of the present invention, including the following: (i) target dataset 502; (ii) optional target dataset schema/meta information 504; (iii) schematic-based data linker 506, which includes sub-components: (a) metadata extractor 508, (b) data normalizer 510, (c) data linking engine 512, (d) data augmentation engine 530, (e) augmented dataset 532, and (f) de-identification linking risk engine 534; (iv) accessible datasets 514, including datasets: (a) private Electronic Medical Records (EMR) 516, (b) business data 518, (c) voter lists 520, (d) customer details 524, and (e) order details 526; (v) semantic normalized knowledge base 528; and (vi) linking risk score 536.

In the second embodiment shown in FIG. 5, target dataset 502 is passed as an input of the system, shown as semantic-based data linker 506, optionally with additional information about the content of the dataset shown as target dataset schema/meta information 504. Next, metadata extractor 508 analyzes target dataset 502 and identifies its content, in terms of schema, semantic type, language, encoding etc. This step is optional if such information is provided by the user as input to the system, such as target dataset schema/meta information 504. Next, the content of target dataset 502 and the (perhaps extracted) metainformation are then normalized by a data normalizer component, data normalizer 510. Next, data linkage engine 512 maps individual normalized values and metainformation of the target dataset (for example, including an entity called "Justin Trudeau") to pre-existing normalized values contained within semantic normalized knowledge base 528 (for example, including an entity called "Prime Minister of Canada"). This semantic normalized knowledgebase is populated a-priori of this system being run using external knowledge bases (for example, WikiData, DBpedia, or proprietary knowledge bases such as Wolfram Knowledgebase). The link target discovery is made responsible for the identification of which dataset to use to expand, according to context and any additional information available. Additionally, data linking engine 512 also links the target dataset with other, previously annotated, private and public datasets shown as accessible datasets 514, including: (i) private Electronic Medical Records (EMR) 516, (ii) business data 518, (iii) voter lists 520, (iv) customer details 524, and (v) order details 526. Next, data augmentation engine 530 uses the links provided by data linking engine 512 and augments the target dataset with the attributes contained within the various data repositories each data entity is linked to. Data linking engine 512 and data augmentation 530 execute their processes iteratively until it is not possible to identify any more meaningful data links in any of the data repositories. Finally, augmented dataset 532, the output of data augmentation engine 530, is assessed against one or more standard de-identification risk engines.

Some embodiments of the present invention include normalizing data or information from one or more data sets. In an example of such normalization, two datasets include a column containing gender values in two different languages. This example also assumes that the example embodiment is using a knowledge base, such as DBPedia, which contains semantic representation of concepts, like "Gender", its various possible values, and has translations of the labels associated to the various values. In this example, the normalization can be performed by translating both against the semantic concept representing the actual gender value, instead of a specific label. In another example, two datasets are to be linked on the "age" concept. The first dataset contains year of birth, the second one the age value and, by context, the system has a date reference for this dataset. In this example, normalization consists of transforming the values in a dataset into the same format as the other. For example, replacing "age" with "year of birth."

Some embodiments of the present invention may include one, or more, of the following operations, features, characteristics and/or advantages: (i) allow the joining of datasets (tables) that contain values that are semantically related but have a different representation; (ii) the first system for estimating identification risk of datasets via semantic-based data generalization and augmentation; (iii) identify external datasets to be linked with the given arbitrary dataset in order to identify which subsets of the dataset are vulnerable attacks leveraging such external dataset to re-identify individuals; (iv) performance without receiving information about the individuals as input; (v) calculate re-identification risks; (vi) dynamic incorporation of external datasets based on the existing de-identification risks identified of the input dataset at each iteration; (vii) identify any risks associated with deidentification; (viii) augment datasets with dynamically identified external datasets based on existing de-identification risks analysis of the arbitrary dataset at each augmentation iteration; (ix) using the semantic information for augmenting the existing dataset; (x) provide functionality for the application of re-identification risk metrics on the augmented dataset; (xi) provide evidence of the linked dataset that might lead to high re-identification risks; (xii) using the joint dataset for estimating the re-identification risk; (xiii) how to identify/select potentially correlated datasets suitable for joining; (xiv) joining datasets, i.e. structured data, joining with the purpose of estimating the re-identification risk; (xv) provide functionality for the application of re-identification risk metrics on the augmented dataset; and (xvi) provide evidence of the linked dataset that might lead to high reidentification risks.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Data Linking: the process of identifying data contained within different datasets that refer to the same entity. For instance, the entity "Justin Trudeau" might be present within dataset A while dataset B might contain the entity "Prime Minister of Canada." The process of data linking would identify both entities as belonging to the same real world entity, linking dataset A and dataset B regarding information concerning the same real world entity.

Data Augmentation: the process of adding attributes corresponding to an entity in one dataset from to an entity contained within another dataset. For example, dataset B might include attributes for entity "Justin Trudeau" such as name, date of birth, and nationality, while dataset A might include attributes for the entity Prime Minister of Canada such as Name, political party, and years served in the office of Prime Minister. By applying data linking to dataset B and dataset A for the same shared entity present within each dataset, data augmentation appends the attributes corresponding to the shared entity to one or both datasets, augmenting the dataset concerning the shared entity.

Semantic Representation: an abstraction upon natural languages representing meanings of words or combinations of words sourced from natural languages, such as English, Japanese, Swahili, French, Spanish, German, etc.

What is claimed is:

1. A computer-implemented method comprising:
receiving a target dataset comprising a plurality of subsets corresponding to a plurality of entities, with a given subset including information indicative of at least one attribute of a given entity;
for the given subset, determining semantic representations corresponding to the at least one attribute of the given entity;
augmenting the target dataset, using the determined semantic representations of the target dataset as initial parameters, iteratively, until determining that there are no semantic representations of the given entity present in the identified auxiliary datasets corresponding to an attribute previously omitted from the target dataset, including:
identifying auxiliary datasets including information indicative of attributes corresponding to the given entity based, at least in part, on the determined semantic representations of the target dataset,
determining semantic representations of the attributes of the given entity present in the auxiliary datasets,
determining at least one semantic representation of the given entity present in the identified auxiliary datasets corresponds to a previously omitted attribute from the target dataset,
augmenting the target dataset with the determined at least one semantic representation corresponding to the previously omitted attribute, wherein augmenting the target dataset further comprises appending a subset that is added to the target dataset with the previously omitted attribute, and
iteratively identifying additional attributes using the augmented target dataset, wherein the iteratively identifying further comprises using a semantic representation of the previously omitted attribute associated with the subset in a search to identify the additional attributes present in the auxiliary datasets;
generating an identification score for the given entity based, at least in part, on an amount of the additional attributes added to the augmented target dataset, wherein the identification score is incremented based on an accumulation of each one of the additional attributes;
managing data privacy controls for the target dataset based, at least in part, on the identification score; and
redacting at least one attribute corresponding to the given entity from the received target dataset based, at least in part, on the identification score.

2. The computer-implemented method of claim 1, wherein the identification score corresponds to an evaluation describing a difficulty in identifying the given entity using the semantic representations in the augmented target dataset.

3. The computer-implemented method of claim 1, wherein the plurality of entities are individual humans.

4. A computer program product comprising:
a machine readable storage device; and
computer code stored on the machine readable storage device, with the computer code including instructions for causing a processor(s) set to perform operations including the following:
receiving a target dataset comprising a plurality of subsets corresponding to a plurality of entities, with a given subset including information indicative of at least one attribute of a given entity;
for the given subset, determining semantic representations corresponding to the at least one attribute of the given entity;
augmenting the target dataset, using the determined semantic representations of the target dataset as initial parameters, iteratively, until determining that there are no semantic representations of the given entity present in the identified auxiliary datasets corresponding to an attribute previously omitted from the target dataset, including:
identifying auxiliary datasets including information indicative of attributes corresponding to the given entity based, at least in part, on the determined semantic representations of the target dataset,
determining semantic representations of the attributes of the given entity present in the auxiliary datasets,
determining at least one semantic representation of the given entity present in the identified auxiliary datasets corresponds to a previously omitted attribute from the target dataset,
augmenting the target dataset with the determined at least one semantic representation corresponding to the previously omitted attribute, wherein augmenting the target dataset further comprises appending a subset that is added to the target dataset with the previously omitted attribute, and
iteratively identifying additional attributes using the augmented target dataset, wherein the iteratively identifying further comprises using a semantic representation of the previously omitted attribute associated with the subset in a search to identify the additional attributes present in the auxiliary datasets;
generating an identification score for the given entity based, at least in part, on an amount of the additional attributes added to the augmented target dataset, wherein the identification score is incremented based on an accumulation of each one of the additional attributes;
managing data privacy controls for the target dataset based, at least in part, on the identification score; and
redacting at least one attribute corresponding to the given entity from the received target dataset based, at least in part, on the identification score.

5. The computer program product of claim 4, wherein the identification score corresponds to an evaluation describing a difficulty in identifying the given entity using the semantic representations in the augmented target dataset.

6. The computer program product of claim 4, wherein the plurality of entities are individual humans.

7. A computer system comprising:
a processor(s) set;
a machine readable storage device; and
computer code stored on the machine readable storage device, with the computer code including instructions for causing the processor(s) set to perform operations including the following:

receiving a target dataset comprising a plurality of subsets corresponding to a plurality of entities, with a given subset including information indicative of at least one attribute of a given entity;

for the given subset, determining semantic representations corresponding to the at least one attribute of the given entity;

augmenting the target dataset, using the determined semantic representations of the target dataset as initial parameters, iteratively, until determining that there are no semantic representations of the given entity present in the identified auxiliary datasets corresponding to an attribute previously omitted from the target dataset, including:

identifying auxiliary datasets including information indicative of attributes corresponding to the given entity based, at least in part, on the determined semantic representations of the target dataset, determining semantic representations of the attributes of the given entity present in the auxiliary datasets, determining at least one semantic representation of the given entity present in the identified auxiliary datasets corresponds to a previously omitted attribute from the target dataset, augmenting the target dataset with the determined at least one semantic representation corresponding to the previously omitted attribute, wherein augmenting the target dataset further comprises appending a subset that is added to the target dataset with the previously omitted attribute, and iteratively identifying additional attributes using the augmented target dataset, wherein the iteratively identifying further comprises using a semantic representation of the previously omitted attribute associated with the subset in a search to identify the additional attributes present in the auxiliary datasets;

generating an identification score for the given entity based, at least in part, on an amount of the additional attributes added to the augmented target dataset, wherein the identification score is incremented based on an accumulation of each one of the additional attributes;

managing data privacy controls for the target dataset based, at least in part, on the identification score; and redacting at least one attribute corresponding to the given entity from the received target dataset based, at least in part, on the identification score.

8. The computer system of claim 7, wherein the identification score corresponds to an evaluation describing a difficulty in identifying the given entity using the semantic representations in the augmented target dataset.

9. The computer system of claim 7, wherein the plurality of entities are individual humans.

* * * * *